(12) United States Patent
Jennings et al.

(10) Patent No.: US 11,861,926 B2
(45) Date of Patent: *Jan. 2, 2024

(54) METHODS AND SYSTEMS FOR RECEIPT CAPTURING PROCESS

(71) Applicant: State Farm Mutual Automobile Insurance Company, Bloomington, IL (US)

(72) Inventors: Robert Alpine Jennings, Bloomington, IL (US); Theresa E. Lommatsch, Bloomington, IL (US); Ben Kobulnicky, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,425

(22) Filed: Apr. 4, 2022

(65) Prior Publication Data

US 2022/0222958 A1    Jul. 14, 2022

Related U.S. Application Data

(63) Continuation of application No. 16/806,588, filed on Mar. 2, 2020, now Pat. No. 11,321,560.
(Continued)

(51) Int. Cl.
*G06V 30/416* (2022.01)
*G06Q 20/04* (2012.01)
(Continued)

(52) U.S. Cl.
CPC ......... *G06V 30/416* (2022.01); *G06Q 20/047* (2020.05); *G06Q 30/012* (2013.01);
(Continued)

(58) Field of Classification Search
CPC .. G06V 30/413; G06V 30/414; G06V 30/416; G06Q 20/047; G06Q 20/389; G06Q 30/012
See application file for complete search history.

(56) References Cited

U.S. PATENT DOCUMENTS 10,115,083 B1    10/2018  Koeppel
2009/0271322 A1  10/2009  Lay et al.
(Continued)

*Primary Examiner* — Daniel G Mariam
(74) *Attorney, Agent, or Firm* — Armstrong Teasdale LLP

(57) ABSTRACT

A receipt capture tool residing on a customer mobile device may be initiated when a customer completes an in-store or online purchase. The receipt capture tool may prompt the customer to capture an image of a receipt detailing a purchase and an item (e.g., product or service) purchased. For instance, the photo of a physical receipt may be taken by the mobile device, or an electronic receipt or email detailing the purchasing transmitted from a physical merchant or online merchant server may be stored. Receipt information may be extracted and saved with other information pertinent to the item purchased, including warranty information. If the customer needs to return or repair the item purchased at a future date, the receipt and warranty information may be subsequently accessed via their mobile device. The receipt and warranty information may also be stored in a searchable database to facilitate easy retrieval by the customer.

20 Claims, 7 Drawing Sheets

Related U.S. Application Data

(60) Provisional application No. 62/944,163, filed on Dec. 5, 2019, provisional application No. 62/972,228, filed on Feb. 10, 2020, provisional application No. 62/980,684, filed on Feb. 24, 2020.

(51) Int. Cl.
| | |
|---|---|
| *G06Q 30/012* | (2023.01) |
| *G06V 30/413* | (2022.01) |
| *G06V 30/414* | (2022.01) |
| *G06Q 30/04* | (2012.01) |
| *G06V 30/41* | (2022.01) |

(52) U.S. Cl.
CPC ............. *G06Q 30/04* (2013.01); *G06V 30/41* (2022.01); *G06V 30/413* (2022.01); *G06V 30/414* (2022.01)

(56) References Cited

U.S. PATENT DOCUMENTS

| | | |
|---|---|---|
| 2012/0221446 A1 | 8/2012 | Grigg et al. |
| 2015/0019456 A1 | 1/2015 | Smith |
| 2016/0328803 A1* | 11/2016 | Whitley ............... G06Q 10/107 |
| 2018/0025340 A1 | 1/2018 | Schlosser et al. |
| 2021/0004880 A1 | 1/2021 | Benkreira et al. |

* cited by examiner

METHODS AND SYSTEMS FOR RECEIPT CAPTURING PROCESS

CROSS REFERENCE TO RELATED APPLICATIONS

This application is a continuation of U.S. patent application Ser. No. 16,806,588, filed Mar. 2, 2020, which claims the benefit of U.S. Application No. 62/944,163, filed Dec. 5, 2019 and entitled "METHODS AND SYSTEMS FOR RECEIPT CAPTURING PROCESS," U.S. Application No. 62/972,228, filed Feb. 10, 2020 and entitled "METHODS AND SYSTEMS FOR RECEIPT CAPTURING PROCESS," and U.S. Application No. 62/980,684, filed Feb. 24, 2020 and entitled "METHODS AND SYSTEMS FOR RECEIPT CAPTURING PROCESS," the disclosure of each of which is hereby expressly incorporated by reference herein in its entirety.

FIELD OF THE DISCLOSURE

The present disclosure generally relates to receipt capturing process, and more particularly to methods and systems for capturing receipt information of a purchased item and retaining it in a secure database of a financial institution for future access.

BACKGROUND OF THE DISCLOSURE

Consumers purchase hundreds of items every year, and consumers may be required to retain receipts of the purchased items for future access. The purchase receipt may be required to return a purchased item or to receive warranty benefits. It would be burdensome for the customers to retain receipts of purchases to document expenses or for warranty purposes.

For example, a consumer buys a 60 inch television at a big box retailer, which comes with a one-year warranty. Within one year, the television stops working. The consumer cannot find the receipt of the television, and cannot recall when and/or where it was purchased. It would be difficult for the consumer to know whether it is still covered under the warranty. Even if the consumer remembers that it is within one year from the purchase date, the consumer may be typically required to produce the purchase receipt with the retailer's name on the receipt to prove the original purchase date and the purchase price to receive warranty benefits.

Conventional techniques may be ineffective, inefficient, costly, awkward, and/or include additional drawbacks as well.

SUMMARY

The present embodiments relate to computer systems and methods that may improve efficiency of a receipt capturing process. In some aspects, a purchase of an item (or service) at a merchant location or online may trigger or cause a mobile device to ask the purchaser if they would like to capture receipt information, along with other information, such as notes or warranty information, and store the receipt and other information at a remotely accessible database, memory unit, and/or server for future use or reference. The receipt information may be captured via a photo of a physical receipt, or captured by saving an electronic receipt or email received from a physical or online merchant computing device or server.

In one aspect, a computer-implemented method for conducting a receipt capturing process may be provided. The method may be implemented via one or more local or remote processors, servers, sensors, and/or transceivers. The method may include, via the one or more local or remote processors, servers, sensors, and/or transceivers: (1) determining whether a customer purchased an item (such as a product or service) using an account that has a receipt capturing tool activated; (2) transmitting, in response to determining that the customer purchased the item (e.g., the product or service) using the account that has the receipt capturing tool activated, a captured receipt alert to the customer inquiring whether to capture a receipt of the purchased item; (3) analyzing, in response to receiving an indication to capture the receipt of the purchased item, the receipt to determine receipt information; and/or (4) storing the receipt information in a secure database. The receipt information may include information detailing a purchased item, a purchase date, a purchase amount, seller information, a retention period, warranty information, and a category of which the receipt is stored in the secure database. The receipt information may be stored in the database or memory unit that may be remotely searchable, such as via a customer mobile device. The method may include additional, less, or alternate functionality, including that discussed elsewhere herein.

In another aspect, a computer system for capturing a receipt associated with a purchase of an item may be provided. The computer system may include: (a) a network; (b) a computing device; and (c) a server communicatively coupled to the computing device via the network. The server may be configured to: (1) determine whether a customer purchased an item (such as a product or service) using an account that has a receipt capturing tool activated; (2) transmit, in response to a determination that the customer purchased the item (e.g., the product or service) using the account that has the receipt capturing tool activated, a captured receipt alert to the customer inquiring whether to capture a receipt of the purchased item; (3) analyze, in response to a receipt of an indication to capture the receipt of the purchased item, the receipt to determine receipt information; and/or (4) store the receipt information in a secure database. The receipt information may include information detailing a purchased item, a purchase date, a purchase amount, seller information, a retention period, warranty information, and a category of which the receipt is stored in the secure database. The receipt information may be stored in a database or memory unit in communication with the server and that may be remotely searchable, such as via a customer mobile device. The system may include additional, less, or alternate functionality, including that discussed elsewhere herein.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Figure 1:
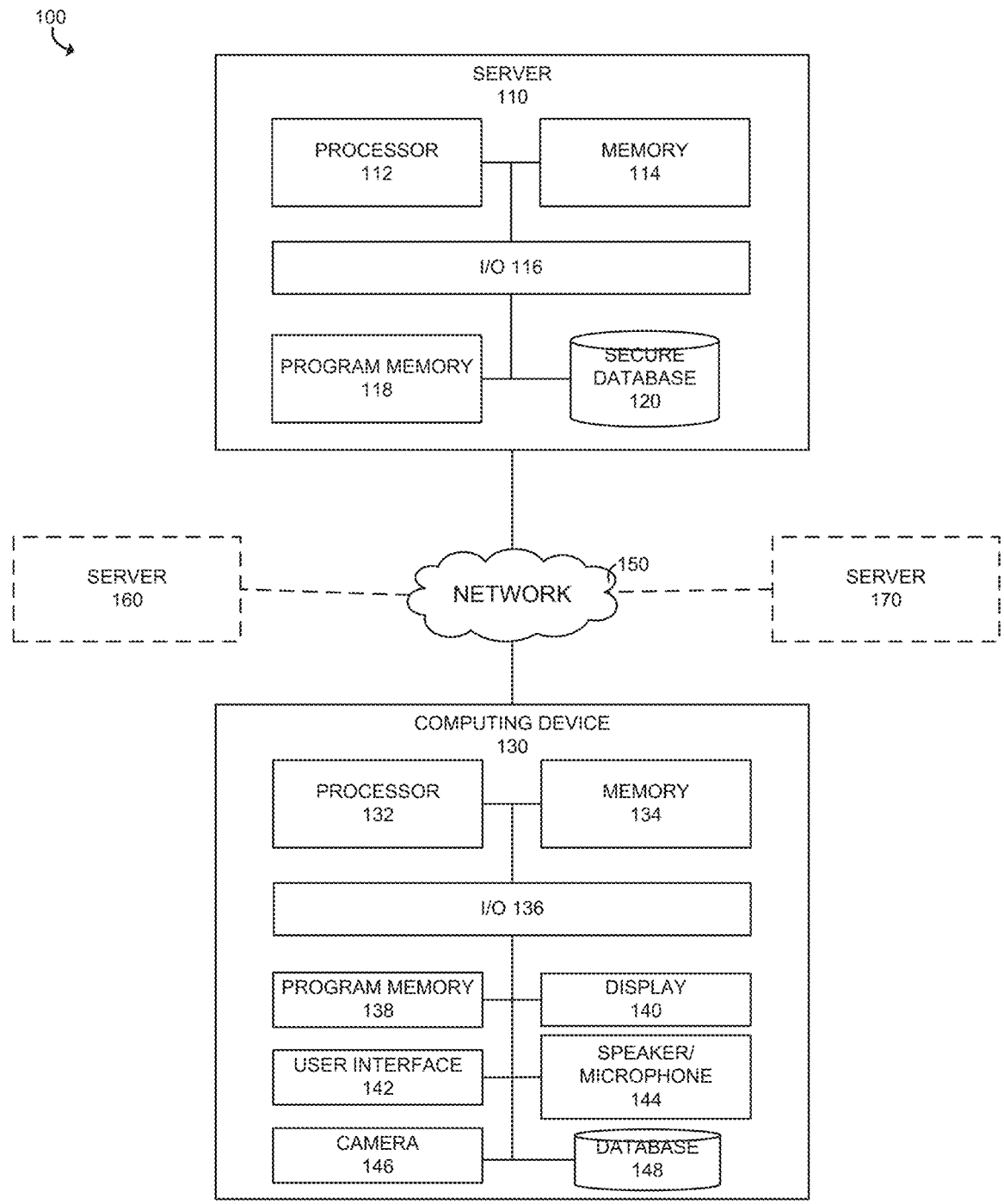
FIG. 1 is a block diagram illustrating an exemplary computer system including a server and a computing device according to an embodiment as disclosed herein.
Figure 2:
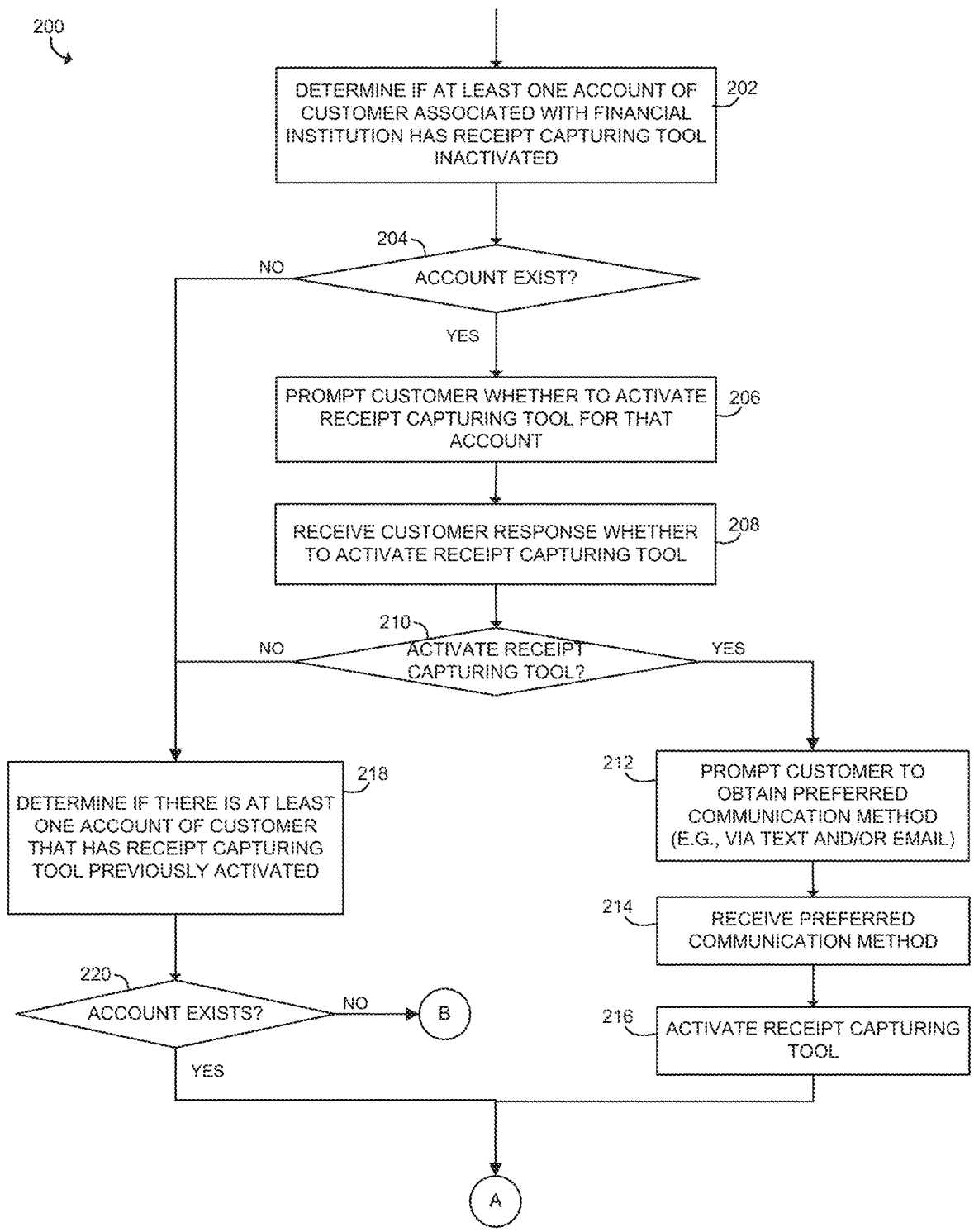
FIGS. 2-4 are a flow diagram illustrating an exemplary computer-implemented method for capturing receipts.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

For the purposes of promoting an understanding of the principles of the present disclosure, reference below is made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings. One of ordinary skill in the art will realize that the embodiments provided can be implemented in hardware, software, firmware, and/or a combination thereof. Programming code according to the embodiments can be implemented in any viable programming language or a combination of a high-level programming language and a lower level programming language.

DETAILED DESCRIPTION

The present embodiments may relate to, inter alia, computer systems and computer-implemented methods that facilitate a receipt capturing process. In some aspects, a purchase of an item (such as a product or service) at a merchant location or online may trigger or cause a mobile device to ask the purchaser if they would like electronically capture receipt information, along with other information, such as notes or warranty information, and store the electronic receipt and other information at a remotely accessible and searchable database, memory unit, and/or server for future use or reference.

In some aspects, a receipt capture tool residing on a customer mobile device may be initiated when a customer completes an in-store or online purchase. The receipt capture tool may prompt the customer to capture an image of a receipt detailing a purchase and an item (e.g., a product or service) purchased. For instance, the photo of a physical receipt may be taken by the mobile device, or an electronic receipt or email detailing the purchasing transmitted from a physical merchant or online merchant server may be stored. Receipt information may be extracted, such as via OCR (optical character recognition), and saved with other information pertinent to the item purchased, including warranty information. If the customer needs to return or repair the item (in the case of a product) purchased at a future date, the receipt and warranty information may be subsequently accessed via their mobile device. The receipt and warranty information may also be stored in a searchable database to facilitate easy retrieval by the customer.

While the present embodiments may be used to capture and store hard copy or electronic receipts associated with items or products purchased (e.g., appliances, televisions, computers, mobile devices, electronic devices, etc.), the present embodiments may also be used to capture and store hard copy or electronic receipts associated with services purchased. For instance, a homeowner may pay a contractor or service person to make a repair at their residence. In the way, the captured receipt may also function as a home maintenance log, and may also be used to track warrantees on work performed, as well as to track the date the work was performed and by whom.

In one aspect, the services may relate to automobiles, such as oil changes, maintenance, repairs, new parts, etc. The service-related receipts and other documents captured by the present embodiments may include auto maintenance receipts and bills, as well as auto warranty documents, and auto insurance receipts and any claim documents.

In another aspect, the services may relate to homes, such as maintenance, repairs, new roofs and roof installation, new siding and siding installation, yard work, new window installation, kitchen or bathroom upgrade work, new appliances and associated installation, etc. The service-related receipts and other documents captured by the present embodiments may include home maintenance receipts and bills, as well as home warranty documents, and homeowners insurance receipts and any claim documents.

Other types of service-related images and documents may also be captured and stored with the present receipt capture embodiments.

Exemplary Computer System

FIG. 1 is a block diagram of a computer system 100 for capturing receipt information of a purchased item at or near the time of the purchase to be stored in a secure database for further access. The receipt information may include, but is not limited to, a purchased item (e.g., the item name and/or description), a purchase date, a purchase amount, seller/retailer information, a merchant chain, type of merchant (such as online or brick-and-mortar), a retention period, warranty information, and a category of which the receipt is stored in the secure database. To do so, the system 100 may include a server 110 (e.g., a financial institution's computer system) and a computing device 130 associated with a customer that is communicatively coupled to the server 110 via a network 150 (e.g., a local area network (LAN), a wide area network (WAN), a personal area network (PAN), the Internet, etc.). The system 100 may further include one or more servers 160, 170 that are associated with other financial institution's computer system such that the computing device 130 may communicate with different financial institutions.

In general, the computing device 130 may include any existing or future devices capable of detecting, collecting, storing, transmitting, and/or displaying data to the customer. For example, the computing device may be, but not limited to, a computer, a notebook, a laptop, a mobile device, a smartphone, a tablet, wearable, smart glasses, or any other suitable computing device that is capable of communicating with the server 110. In operation, the computing device 130 is operated by the customer to capture receipts.

For example, the customer may use an application (e.g., a financial institution mobile app, a website application associated with a financial institution) running on the customer's mobile device (e.g., the computing device 130) to capture a receipt via a receipt capturing tool. The customer may be prompted by a server associated with a financial institution (e.g., 110) at or near the time of the purchase of an item to capture the receipt of the purchased item via direct or indirect wireless communication or data transmission from the application running on the customer's mobile device. Alternatively, the customer may choose to manually record a receipt of a purchased item via the application running on the customer's mobile device that is in communication with the server associated with a financial institution. Additionally or alternatively, the customer may choose to manually record an electronic receipt of an item that is purchased online or via the internet from an online merchant, such as via Amazon.com or BestBuy.com.

It should be appreciated that the receipt capturing tool may be used to capture receipts not only for purchased items, but also for purchased services (e.g., new installation, replacement, or improvements of a structure and/or an automobile). For example, if a home owner is paying a contractor or a service person to make a repair at home, the receipt capturing tool may capture the receipt of the purchased service at or near the time of the payment of the service. Alternatively, the home owner may choose to manually record the receipt (e.g., a hardcopy or electronic receipt) of the purchased service. As such, the application may also function as a home maintenance log and may be used to track the date of the service, the name of the company who performed the service, and/or any warranty information The computing device 130 includes a processor 132 (e.g., a central processing unit (CPU) and/or a graphics processing unit (GPU)), a memory 134 (e.g., random-access memory (RAM), read-only memory (ROM), and/or flash memory), an input/output (I/O) controller 136 (e.g., a network transceiver), a memory unit 138, a display 140, a user interface 142 (e.g., a display screen, a touchscreen, and/or a keyboard), a speaker/microphone 144, and a camera 146, all of which may be interconnected via one or more address/data bus. It should be appreciated that although only one processor 132 is shown, the computing device 130 may include multiple processors 132. Although the I/O controller 136 is shown as a single block, it should be appreciated that the I/O controller 136 may include a number of different types of I/O components.

The computing device 130 may further include a database 148. As used herein, the term "database" may refer to a single database or other structured data storage, or to a collection of two or more different databases or structured data storage components. In the illustrative embodiment, the database 148 is part of the computing device 130. In some embodiments, the computing device 130 may access the database 148 via a network such as network 150. The database 148 may store data that is to be transmitted to the server 110. For example, the data may include a photograph of a receipt or a scanned receipt, such as a hardcopy receipt from an in-store purchase. Additionally or alternatively, the data may include or be associated with a digital image of a receipt or an electronic receipt from an in-store purchase or from an online purchase.

The computing device 130 may further include a number of software applications stored in a memory unit 138, which may be called a program memory. The various software applications on the computing device 130 may include specific programs, routines, or scripts for performing processing functions associated with the methods described herein. Additionally or alternatively, the various software applications on the computing device 130 may include general-purpose software applications for data processing, database management, data analysis, network communication, web server operation, or other functions described herein or typically performed by a server. The various software applications may be executed on the same computer processor or on different computer processors. Additionally, or alternatively, the software applications may interact with various hardware modules that may be installed within or connected to the computing device 130. Such modules may implement part of or all of the various exemplary method functions discussed herein or other related embodiments.

The microphone and/or speaker 144 may be used to communicate with a user of the receipt capturing tool to facilitate capturing receipts. To do so, the microphone may be any electronic device that is capable of capturing sound and converting into an electrical audio output signal. In the illustrative embodiment, the microphone is configured to capture a voice of a user (e.g., a customer) using the receipt capturing tool. For example, as described further below, a customer may capture receipts (e.g., to enter or edit receipt information) using voice dictation via the microphone of the computing device 130. The speaker may be any electronic device that is capable of generating sound in response to an electrical audio input signal. In some embodiments, the receipt capturing tool may play audio instructions via the speaker to guide the customer through the receipt capturing process.

The camera 146 may be any electronic device that is capable of capturing an image. In the illustrative embodiment, the camera 146 may be used to capture an image of a hardcopy receipt from an in-store purchase. It should be appreciated that, in some embodiments, the camera 146 may be used to capture an image of an electronic receipt that is displayed on a display screen of another computing device.

Although only one computing device 130 is shown in FIG. 1, the server 110 is capable of communicating with multiple computing devices similar to the computing device 130, wherein each computing device is associated with a customer and is configured to transmit data (e.g., any data input, receipt information, a photograph of a receipt, a scanned receipt, electronic receipt, online receipt, etc.) to the server 110.

Referring now to the server 110, the server 110 includes a processor 112 (e.g., a microprocessor, a microcontroller), a memory 114, and an input/output (I/O) controller 116 (e.g., a network transceiver). The server 110 may be a single server or a plurality of servers with distributed processing. The server 110 may receive data from and/or transmit data to the computing device 130 and may store data in a secure database 120.

In operation, the server 110 associated with a financial institution may capture a receipt for a customer, who has one or more accounts (e.g., debit account(s) and/or credit card(s)) with the financial institution, and retain the receipt at a secure database of the financial institution for record keeping. To do so, the server 110 may be configured to determine if the server 110 requires permission from the customer to activate a receipt capturing tool of at least one customer's account associated with the financial institution. In other words, the server 110 may determine whether the customer has an account that has a receipt capturing tool inactivated so that the server 110 may receive permission from the customer to activate the receipt capturing tool feature. As described above, the receipt capturing tool allows the customer to capture the receipt at or near the time of the purchase. Additionally or alternatively, the receipt capturing tool may allow the customer to capture or copy an electronic receipt, such as from an online purchase.

If the server 110 determines that the customer has an account that has a receipt capturing tool inactivated, the server 110 may prompt the customer whether to activate a receipt capturing tool for that account. It should be appreciated that the server 110 may prompt the customer an option to activate a receipt capturing tool for one or more accounts. The prompt may be provided to the customer via a text, an email, and/or a phone call. If the customer has a preferred method of communication (e.g., a text, an email, and/or a phone call) set up with the financial institution, the server 110 may communicate with the customer via the preferred method of communication.

Subsequently, the server 110 may receive a response from the customer whether to activate the receipt capturing tool. In some cases, the customer may select one or more accounts that the customer wants to activate the receipt capturing tool. If the server 110 determines that the customer indicated that the customer wishes to activate the receipt capturing tool for one or more accounts, the server 110 may prompt the customer to obtain a preferred communication method for receiving captured receipt alerts. The preferred communication method may include a text, an email, and/or a phone call. The server 110 may receive the preferred communication method from the customer and may activate the receipt capturing tool for the one or more accounts indicated by the customer. Subsequently, the server 110 may monitor for a purchase that is made with one or more of customer's accounts that have the receipt capturing tool activated.

If, however, the server 110 determines that the customer does not have any account that has the receipt capturing tool inactivated or does not wish to activate the account that has the receipt capturing tool inactivated, the server 110 may further determine whether the customer has at least one account associated with the financial institution that has the receipt capturing tool activated. For example, the customer may have an account(s) that the customer already elected to opt in for the receipt capturing tool when the customer opened the account(s). If the server 110 determines that such an account exists, the server 110 may monitor for a purchase that is made with that account(s) (i.e., a customer's account(s) that has the receipt capturing tool activated).

Figure 5A:
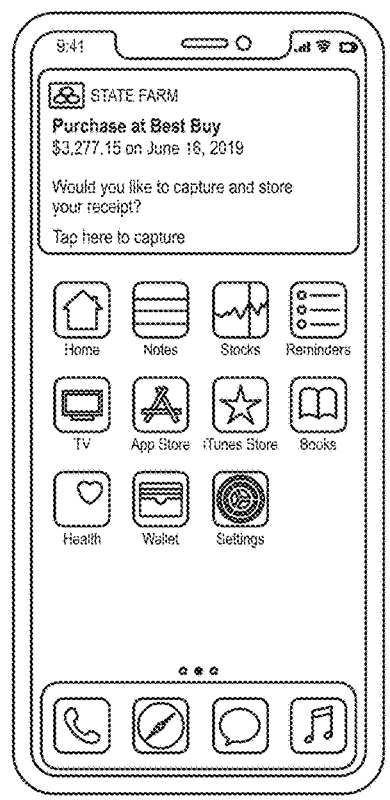
FIGS. 5A-5D are exemplary screen shots that may be displayed on the computing device of FIG. 1 for capturing receipts.

If the server 110 determines that the customer purchased an item using an account (e.g., a debit account or credit card) associated with the financial institution, and the server 110 may further determine whether the account used to purchase the item has the receipt capturing tool activated. If the server 110 determines that the account used to purchase the item has the receipt capturing tool activated, the server 110 may transmit a captured receipt alert to the customer via the preferred communication method. The captured receipt alert may include a purchased item, a purchase date, a purchase amount, and seller/retailer information. Additionally, the captured receipt alerts may further include an inquiry to the customer whether to capture and store the receipt of the purchased item. An exemplary screen shot of the customer's mobile device (e.g., the computing device 130) of such a captured receipt alert is shown in FIG. 5A.

Figure 5B:
Figure 5D:
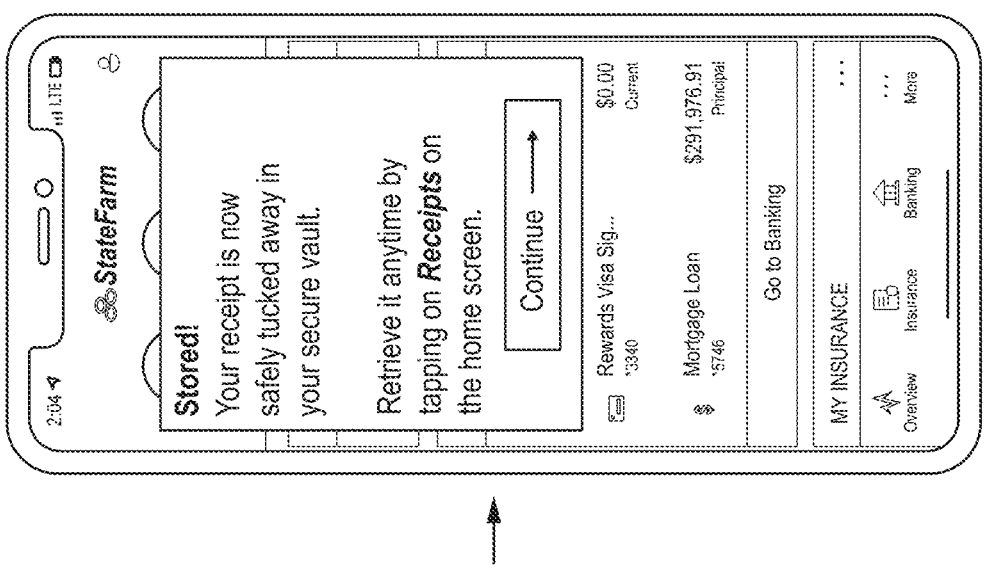
Figure 5C:
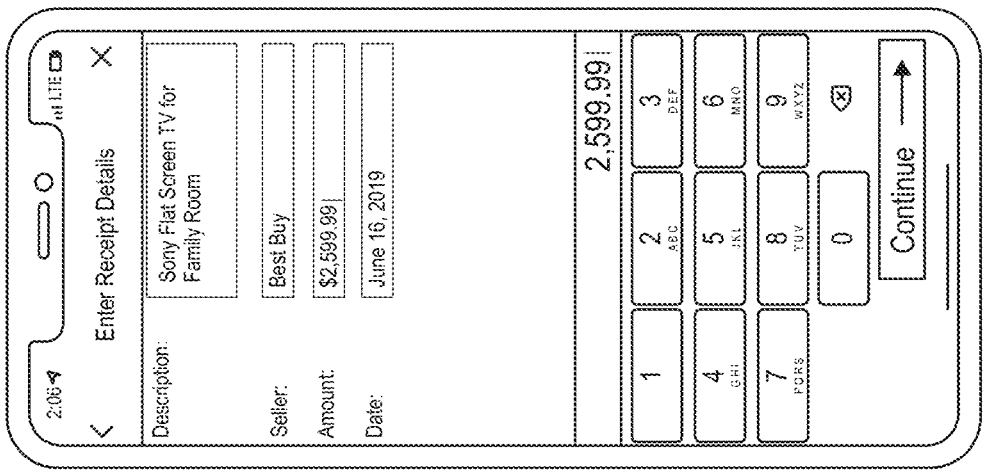

The server 110 may determine receipt information to pre-fill data fields to be stored in a secure database associated with the financial institution. An exemplary screen shot of the customer's mobile device (e.g., the computing device 130) of a receipt detail screen with pre-filled data fields is shown in FIG. 5C. The data fields may include, but not limited to, a purchased item (including the item name and description), a purchase date, a purchase amount, seller/retailer information, a retention period, warranty information, and a category of which the receipt is stored in the secure database.

The retention period indicates how long the receipt will be stored in the secure database. In the illustrative embodiment, the retention period is set up as one year as a default but may be edited by the customer.

Additionally, all purchases may be categorized as "Purchases" category as a default. However, the customer may create or add one or more categories to identify the item (e.g., electronics, clothing, shoes, cosmetics, etc.). The warranty information may be collected from the receipt and/or may be retrieved from a third party server (e.g., a manufacture's web server, a retailer's web server). It should be appreciated that, in some embodiments, the server 110 may have artificial intelligence capabilities that perform machine learning in analyzing a receipt and determining receipt information to pre-fill data fields.

It should be appreciated that the data fields may be edited by the customer. In some embodiments, the data fields may be editable by the customer via a voice memo. For example, the customer may edit the purchased item information by selecting the corresponding data field and using the voice memo feature of the computing device 130 to specify that the purchased item is "Sony Flat Screen TV for Family Room." It should be appreciated that the computing device 130 and/or the server 110 may perform a voice recognition to translate the voice memo into text in the respective data field.

Subsequently, the server 110 may store the receipt information as indicated in the data fields in the secure database associated with the financial institution. An exemplary screen shot of the customer's mobile device (e.g., the computing device 130) that confirms that the receipt has been stored is shown in FIG. 5D. As discussed below, the secure database may be a part of the server 110. Alternatively, in some embodiments, the server 110 may access the secure database via a network such as the network 150. This allows the customer to access the secure database to search, retrieve, view, print, text, or email any of the customer's receipts and/or electronic receipts stored in the secure database, which is described further in FIGS. 6A-6D.

If, however, the server 110 determines that the customer does not have any account that has the receipt capturing tool activated or the account used to purchase the item does not have the receipt capturing tool activated, the server 110 may still capture and store a receipt via a manual receipt capturing process when requested by the customer. To do so, the server 110 may receive a request from the customer that the customer wishes to capture a receipt manually. For example, the customer may use an application (e.g., a financial institution mobile app, a web site application associated with the financial institution) associated with the financial institution to manually record a receipt. Exemplary screen shots of the financial institution mobile app are shown in FIGS. 5A-5D and 6A-6D. The customer may press a "Capture a Receipt" button 612 in the application running on the customer's mobile device (e.g., the computing device 130) as shown in FIG. 6B to record a receipt.

Once the server 110 determines to manually capture the receipt, the server 110 may prompt the customer to take a photograph of a receipt using the customer's mobile device (e.g., the computing device 130) or upload a scanned receipt to the application on the customer's mobile device (e.g., the computing device 130). For example, when the "Capture a Receipt" button 612 is pressed, the application may ask the customer to take a photograph of the receipt, as shown in FIG. 5B. Alternatively, in some embodiments, the server 110 may receive a photographed receipt or a scanned receipt from the customer via a website associated with the financial institution. Additionally or alternatively, the server 110 may prompt the customer whether to manually capture the receipt information without providing a photographed or scanned receipt.

In some embodiments, when the "Capture a Receipt" button 612 is pressed, the application may ask the customer to take a photograph of a hard copy receipt, as shown in FIG. 5B, such as when purchasing an item in a brick-and-mortar store. Additionally or alternatively, the, when the "Capture a Receipt" button 612 is pressed, the application may ask the customer to take a photograph of an electronic receipt shown on a mobile device display or other computing device display, such as when purchasing an item online and/or from an online merchant.

Additionally or alternatively, when the "Capture a Receipt" button 612 is pressed, the application may retrieve or receive a digital image of a hard copy receipt or an electronic version of the hard copy receipt from a server associated with a brick-and-mortar store when purchasing an item in the brick-and-mortar store. Additionally or alternatively, when the "Capture a Receipt" button 612 is pressed, the application may retrieve or receive a digital image of an electronic receipt or an electronic version of the receipt from a server associated with an online merchant when purchasing an item online.

Subsequently, the server 110 may determine the receipt information to fill the data fields. As described above, the data fields may include, but not limited to, a purchased item (including the item name and description), a purchase date, a purchase amount, seller/retailer information, a retention period, warranty information, and a category of which the receipt is stored in the secure database. To fill the data fields, the server 110 may perform an optical character recognition (OCR) or text recognition of the photograph of the receipt or the scanned receipt. Additionally or alternatively, the server 110 may capture the data fields using a voice memo received from the customer. It should be appreciated that the computing device 130 and/or the server 110 may perform a voice recognition to translate the voice memo into text in the respective data field.

Subsequently, the server 110 may store the receipt information as indicated in the data fields in the secure database associated with the financial institution. As discussed above, such a secure database may be a part of the server 110. Alternatively, in some embodiments, the server 110 may access the secure database via a network such as the network 150. This allows the customer to access the secure database to search, retrieve, view, print, text, or email any of the customer's receipts stored in the secure database, which is described further in FIGS. 6A-6D.

Additionally, in some embodiments, the customer may be able to purchase a warranty for the purchased item through a $3^{rd}$ party, such as an insurance company. For example, upon capturing of a receipt of a purchased item, the server 110 may query the customer whether the customer wishes to purchase a warranty or additional warranty for the purchased item. It should be appreciated that, in some embodiments, the financial institution associated with the server 110 may be affiliated with a particular insurance company. In such embodiments, the server 110 may provide different warranty options for the purchased item from the particular insurance company. In other embodiments, the server 110 may provide options for various insurance companies for the customer to select from. The warranty may be based upon the purchased price, the condition of the item, where it was purchased from, and/or the current warranty information of the purchased item.

The processor 112 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the server 110) may be performed by one or more processors 112. The memory 114 may be a random-access memory (RAM), read-only memory (ROM), a flash memory, or any other suitable type of memory that enables storage of data such as instruction codes that the processor 112 needs to access in order to implement any method as disclosed herein.

A database 120, which may be a single database or a collection of two or more databases, is coupled to the server 110. In the illustrative embodiment, the database 120 is part of the server 110. In some embodiments, the server 110 may access the database 120 via a network such as the network 150. The server 110 may also include various software applications stored in the memory 118 and executable by the processor 112. These software applications may include specific programs, routines, or scripts for performing functions associated with the methods described herein. Additionally, the software applications may include general-purpose software applications for data processing, database management, data analysis, network communication, web server operation, or other functions described herein or typically performed by a server.

The network 150 is any suitable type of computer network that functionally couples at least one computing device 130 with the server 110. The network 150 may include a proprietary network, a secure public internet, a virtual private network and/or one or more other types of networks, such as dedicated access lines, plain ordinary telephone lines, satellite links, cellular data networks, or combinations thereof. In embodiments where the network 150 comprises the Internet, data communications may take place over the network 150 via an Internet communication protocol.

It should be appreciated that the receipt capturing tool may be used to record items, especially high-value items, that are protected by an insurance policy (e.g., a personal article insurance, a renters insurance, or a homeowners insurance). For example, if a home of an insured is broken into, the insured may need to provide a list of specific items that are stolen or damaged and how much those items were worth to file a claim. Additionally, the insured may need to prove that the ownership of the stolen or damaged items. As such, an insured may use the receipt capturing tool to record a proof of ownership of items and store in the secure database. The items may be purchased, gifted, and/or inherited.

For the purchased item, the insured may choose to record the description of the item, the purchased date, the purchased price, the purchased location, the purchased merchant/store, the condition of the item, the category of the item, the warranty information, the insurance information (e.g., insurer, policy number), and/or the ownership information. It should be appreciated that, if the purchased item was automatically captured via the receipt capturing tool at or near the time of purchase, the insured may add data fields to capture additional information, such as the insurance information and/or the ownership information, at the time of capturing the receipt of the purchased item. Alternatively, the insured may modify the existing entry to add additional information by accessing the secure database.

For the gifted or inherited item, the insured may choose to record the description of the item, the gifted or inherited date, the value of the gifted or inherited item, the gifted or inherited location, the condition of the gifted or inherited item at the time when the item was gifted or inherited to the insured, the category of the item, the warranty information, the insurance information (e.g., insurer, policy number), and/or the ownership information. Since the gifted or inherited item cannot be automatically captured by the receipt capturing tool, the insured may manually input these data fields associated with the gifted or inherited items to be stored in the secure database.

Once the items are recorded and stored in the secure database, the insured may access the secure database to search for a specific item and/or generate a summary report based upon data fields (e.g., date, amount, category, and/or insurance information). As such, if the insured is required to provide a proof of ownership of certain items, the insured may access the secure database to generate a summary report of the certain items with one or more data fields.

Exemplary Computer-Implemented Method

Referring now to FIGS. 2-5, a computer-implemented method 200 for capturing a receipt for a customer, who has one or more accounts (e.g., debit account(s) and/or credit card(s)) with a financial institution, and retaining the receipt at a secure database of the financial institution for record keeping is shown. In the illustrative embodiment, the method 200 is performed by a server of a financial institution (e.g., 110). In block 202, the server 110 associated with a financial institution determines if the customer has at least one account associated with the financial institution that has a receipt capturing tool inactivated. If the server 110 determines that such an account does not exist in block 204, the method 200 skips ahead to block 218 to determine if the customer has at least one account that has the receipt capturing tool previously activated, which is described further below.

If, however, the server 110 determines that the customer has an account that has a receipt capturing tool inactivated in block 204, the method 200 advances to block 206. In block 206, the server 110 prompts the customer whether to activate a receipt capturing tool for that account. In some embodiments, the server 110 may prompt the customer an option to activate a receipt capturing tool for one or more accounts. The prompt may be provided to the customer via a text, an email, and/or a phone call. If the customer has a preferred method of communication (e.g., a text, an email, and/or a phone call) set up with the financial institution, the server 110 communicates with the customer via the preferred method of communication.

Subsequently, in block 208, the server 110 receives a response from the customer whether to activate the receipt capturing tool. In some embodiments, the customer may select one or more accounts that the customer wants to activate the receipt capturing tool. If the server 110 determines in block 210 that the customer indicated that the customer would like to activate the receipt capturing tool for one or more accounts, the method 200 advances to block 212.

In block 212, the server 110 prompts the customer to obtain a preferred communication method for receiving captured receipt alerts. The preferred communication method may include a text, an email, and/or a phone call. The server 110 receives the preferred communication method from the customer in block 214 and activates the receipt capturing tool for the one or more accounts indicated by the customer in block 216. Subsequently, the method 200 proceeds to block 222 of FIG. 3.

It should be appreciated that, when the receipt capturing tool is activated, the captured receipt alerts is transmitted to the customer when the server 110 determines that a customer's account (e.g., debit account or credit card) is used to purchase an item. The captured receipt alerts may include, for example, a purchased item, a purchase date, a purchase amount, and seller/retailer information. Additionally, the captured receipt alerts further include an inquiry to the customer whether to capture and store the receipt. An exemplary screen shot of the customer's mobile device (e.g., the computing device 130) of such a captured receipt alert is shown in FIG. 5A. The receipt capturing tool allows the customer to capture the receipt at or near the time of the purchase—whether the purchase is at a physical store or via an online merchant.

Referring back to block 210, if the server 110 determines that the customer indicated that the customer does not wish to activate the receipt capturing tool, the method 200 skips ahead to block 218. In block 218, the server 110 determines if there is at least one account of the customer that has the receipt capturing tool previously activated. For example, the customer may have an account that the customer already elected to opt in for the receipt capturing tool when the customer opened the account. If the server 110 determines that such an account exists, in block 220, the method 200 advances to block 222 shown in FIG. 3. If, however, the server 110 determines that the customer does not have an account that has the receipt capturing tool activated and that the customer does not wish to activate the receipt capturing tool for one or more of the customer's accounts, the method 200 skips ahead to block 238 shown in FIG. 4 for an option for manual receipt capturing process, which is discussed further below.

Figure 3:
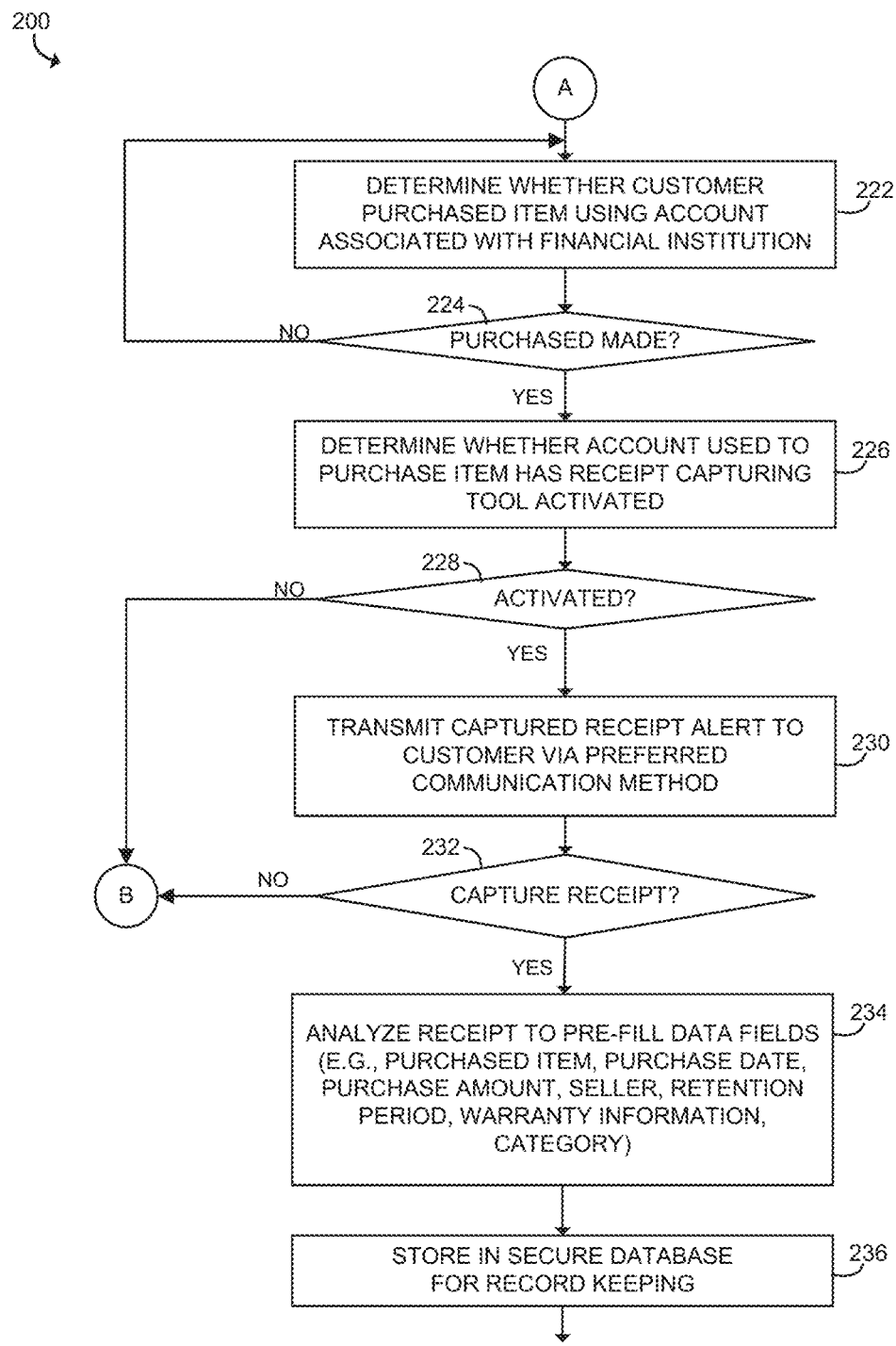

In block 222 of FIG. 3, the server 110 determines whether the customer purchased an item using an account (e.g., a debit account or credit card) associated with the financial institution. If the server 110 determines that a purchase has not been made in block 224, the method 200 loops back to block 222 to continue wait for the customer to make a purchase using an account associated with the financial institution. If, however, the server 110 determines that the purchase has been made using the account associated with the financial institution in block 224, the method 200 advances to block 226.

In block 226, the server 110 determines whether the account used to purchase the item has the receipt capturing tool activated. If the server 110 determines that the account used to purchase the item does not have the receipt capturing tool activated in block 228, the method 200 skips ahead to block 238 shown in FIG. 4 for an option for manual receipt capturing process. If, however, the server 110 determines that the account used to purchase the item has the receipt capturing tool activated, the method 200 advances to block 230.

In block 230, the server 110 transmits a captured receipt alert to the customer via the preferred communication method with the purchased information, including, but not limited to, a purchased item, a purchase date, a purchase amount, and seller information. The notification further includes an inquiry to the customer whether to capture the receipt of the purchased item. An exemplary screen shot of the customer's mobile device (e.g., the computing device 130) of such a captured receipt alert is shown in FIG. 5A.

In response to the transmission of the captured receipt alert, if the server 110 determines that the customer does not wish to automatically capture the receipt of the purchased item using the receipt capturing tool, the method 200 skips ahead to block 238 shown in FIG. 4 for an option for manual receipt capturing process, which is discussed further below. If, however, the server 110 determines that the customer wishes to capture the receipt of the purchased item, the method 200 advances to block 234.

In block 234, the server 110 analyzes the receipt to pre-fill data fields to be stored. An exemplary screen shot of the customer's mobile device (e.g., the computing device 130) of a receipt detail screen with pre-filled data fields is shown in FIG. 5C. The data fields may include, but not limited to, a purchased item (including the item name and description), a purchase date, a purchase amount, seller/retailer information, a retention period, warranty information, and a category of which the receipt is stored in the secure database. The retention period indicates how long the receipt will be stored in the secure database. In the illustrative embodiment, the retention period is set up as one year as a default but may be edited by the customer. Additionally, all purchases may be categorized as "Purchases" category as a default. However, the customer may create or add one or more done or more categories to identify the item (e.g., electronics, clothing, shoes, cosmetics, etc.). The warranty information may be collected from the receipt and/or may be retrieved from a third party server (e.g., a manufacture's web server, a retailer's web server).

It should be appreciated that, in the illustrative embodiment, the data fields may be edited by the customer. In some embodiments, the data fields may be editable by the customer via a voice memo feature. For example, the customer may edit the purchased item information by selecting the corresponding data field and using the voice memo feature of the computing device 130 to specify that the purchased item is "Sony Flat Screen TV for Family Room." To do so, the computing device 130 and/or the server 110 may perform a voice recognition to translate the voice memo into text in the respective data field. It should also be appreciated that some of the receipt information may be determined prior to block 230 to be included in the capture receipt alert.

Subsequently, in block 236, the server 110 stores the receipt information as indicated (or edited) in the data fields in the secure database associated with the financial institution. An exemplary screen shot of the customer's mobile device (e.g., the computing device 130) that confirms that the receipt has been stored in a secure database (e.g., Secure Vault) is shown in FIG. 5D. As discussed above, such a secure database may be a part of the server 110. Alternatively, in some embodiments, the server 110 may access the secure database via a network such as the network 150. This allows the customer to access the secure database to search, retrieve, view, print, text, or email any of the customer's receipts stored in the secure database, which is described further in FIGS. 6A-6D.

Figure 4:
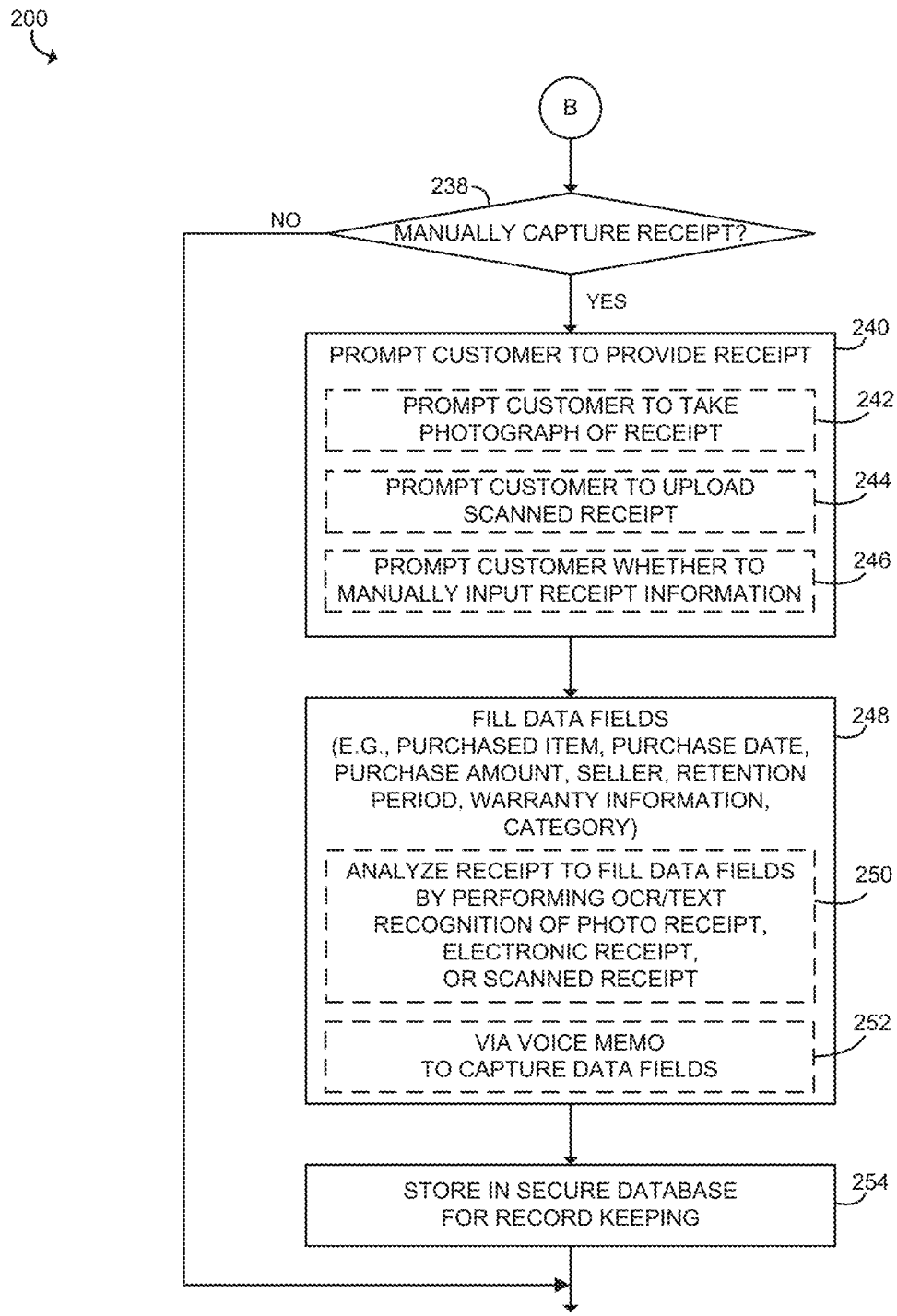

Referring now to block 238 of FIG. 4, the server 110 may determine whether to manually capture a receipt. The server 110 may receive a request from the customer that the customer wishes to capture a receipt manually. For example, the customer may use an application (e.g., a financial institution mobile app, a website application associated with the financial institution) associated with the financial institution to manually record a receipt. Exemplary screen shots of the financial institution mobile app are shown in FIGS. 5A-5D and 6A-6D. The customer may press a "Capture a Receipt" button 612 in the application running on the customer's mobile device (e.g., the computing device 130) as shown in FIG. 6B to capture a receipt.

Once the server 110 determines to manually capture the receipt, the method 200 proceeds to block 240 to prompt the customer to provide the receipt. The server 110 may prompt the customer to take a photograph of a receipt or upload a scanned receipt, as indicated in blocks 242 and 242. For example, when the "Capture a Receipt" button 612 is pressed, the application may ask the customer to take a photograph of the receipt, as shown in FIG. 5B. In some embodiments, the server 110 may receive a photographed receipt or a scanned receipt from the customer via a website associated with the financial institution. As described further below, the customer may provide a photographed receipt, a scanned receipt of a hard copy receipt, an electronic receipt, an electronic receipt email, a screenshot or photograph of the electronic receipt, or a screenshot or photograph of the electronic receipt email to manually capture the receipt of a purchased item. Additionally or alternatively, the server 110 may prompt the customer whether to manually capture the receipt information without providing a photographed or scanned receipt, as indicated in block 246.

As noted herein, in some embodiments, the item may be purchased at a physical store, the customer may receive a hard copy receipt, and take a photograph of the hard copy receipt via their mobile device. Additionally or alternatively, a server or other computing device at the physical store may transmit or send a photo of the receipt or an electronic receipt to the customer's mobile device.

Other embodiments may relate to online purchases. As such, in those embodiments, the item may be purchased online from an online merchant, and the customer may receive an electronic receipt or an email detailing the purchase from the online merchant's server or computing device. The customer may then save the electronic receipt or email or a screenshot of the electronic receipt or email to their mobile device and/or transmit the electronic receipt or email or a screenshot of the electronic receipt or email to their mobile device to a remote server for storage and analysis. Additionally or alternatively, the customer may complete an online purchase via a first computing device, and receive an email or electronic receipt via the first computing device, and take a photograph or screenshot of the email or electronic receipt via their mobile device (or other second computing device) for storage and analysis.

Once the receipt of the purchased item is received, the server 110 fills the data fields as indicated in block 248. As described above, the data fields may include, but not limited to, a purchased item (including the item name and description), a purchase date, a purchase amount, seller/retailer information, a retention period, warranty information, a category of which the receipt is stored in the secure database, and a payment type (e.g., credit card, debit account, cash, check, etc.). The retention period indicates how long the receipt will be stored in the secure database. In the illustrative embodiment, the retention period is set up as one year as a default but may be editable by the customer. Additionally, all purchases may be categorized as "Purchases" category as a default. However, the customer may create or add one or more one or more categories to identify the item (e.g., electronics, clothing, shoes, cosmetics, etc.).

To fill the data fields, the server 110 may analyze a photographed receipt, electronic receipt, receipt email, or a scanned receipt received from the customer. For example, the server 110 may perform an optical character recognition (OCR) or text recognition of the photograph of the hard copy receipt, the screenshot of the electronic receipt or receipt email, or the scanned receipt, as indicated in block 250. Additionally or alternatively, the server 110 may capture and/or edit the data fields using a voice memo received from the customer, as indicated in block 252. It should be appreciated that the computing device 130 and/or the server 110 may perform a voice recognition to translate the voice memo into text in the respective data field.

Subsequently, in block 254, the server 110 stores the receipt information as indicated in the data fields in the secure database associated with the financial institution. As discussed above, such a secure database may be a part of the server 110. Alternatively, in some embodiments, the server 110 may access the secure database via a network such as the network 150. This allows the customer to access the secure database to search, retrieve, view, print, text, or email any of the customer's receipts stored in the secure database, which is described further in FIGS. 6A-6D.

It should be appreciated that, in some embodiments, blocks 202-220 may be optional steps. It should also be understood that although the method 200 is described as being performed by the server 110, in some examples, such method may be performed by an application running on the computing device 130 that is in communication with the server 110.

Exemplary Process

Referring now to FIGS. 5A-5D, exemplary screen shots of a financial institution mobile app running on of the customer's mobile device (e.g., the computing device 130) for receipt capturing process are shown.

When a customer purchases an item with a customer's account (e.g., debit card or credit card) that has the receipt capturing tool activated, the customer receives a captured receipt alert, as illustrated in FIG. 5A. The captured receipt alert may include, for example, a purchased item, a purchase date, a purchase amount, and seller/retailer information. Additionally, the captured receipt alert further includes an inquiry to the customer whether to capture and store the receipt. The receipt capturing tool allows the customer to capture the receipt at or near the time of the purchase.

As noted above, the receipt to be captured may be a hard copy or physical receipt, such as from an in-store purchase. The receipt to be captured may alternatively be an electronic receipt or email received from a physical store server or computing device (for an in-store purchase), or an electronic receipt or email received from an online merchant (for an online purchase). The physical receipt, electronic receipt, and/or email detailing a purchasing may be captured and/or input into the receipt capturing tool and the receipt capturing tool may automatically extract pertinent data as discussed herein, such as item, price, date, location, merchant, warranty information, and other data detailed herein.

Returning to the Figures, a receipt detail screen with data fields may be pre-filled upon automatically receiving the purchase information via the receipt capturing tool. As shown in FIG. 5C, the data fields may include a purchased item (including the item name and description), a purchase date, a purchase amount, and seller/retailer information. Although it is not shown in FIG. 5C, the data fields may further include a retention period, warranty information, and a category of which the receipt is stored in the secure database. The retention period indicates how long the receipt will be stored in the secure database. In the illustrative embodiment, the retention period is set up as one year as a default but may be editable by the customer.

Additionally, all purchases may be categorized as "Purchases" category as a default. However, the customer may create or add one or more one or more categories to identify the item (e.g., electronics, clothing, shoes, cosmetics, etc.). The warranty information may be collected from the receipt and/or may be retrieved from a third party server (e.g., a manufacture's web server, a retailer's web server).

Those data fields may be editable by the customer. For example, the data fields may be edited by the customer via a user interface (e.g., a touch screen, a keyboard, and/or a microphone). As illustrated in FIG. 5C, the customer may edit the purchased item information by selecting the corresponding data field to specify that the purchased item is "Sony Flat Screen TV for Family Room."

Subsequently, the receipt information as indicated (or edited) in the data fields may be stored in the secure database associated with the financial institution (also referred to as a secure vault in this application). The confirmation may be presented to the customer as shown in FIG. 5D. As discussed above, such a secure database may be a part of the server (e.g., 110) associated with the financial institution. Alternatively, in some embodiments, the server (e.g., 110) may access the secure database via a network such as the network 150. This allows the customer to access the secure database to search, retrieve, view, print, text, or email any of the customer's receipts stored in the secure database, which is described further in FIGS. 6A-6D. In some embodiments, the customer's receipt may be searchable via the data fields and/or categories.

Alternatively, the customer may choose to manually record receipt information of a purchased item via the financial institution mobile app running on of the customer's mobile device. For example, the customer may choose to manually record the receipt information in response to receiving, via the receipt capturing tool, a prompt from a server associated with a financial institution whether to capture a receipt of an item purchased with the customer's account (e.g., debit account or credit card). Alternatively, if the customer purchases an item using cash, the receipt capturing tool is not able to automatically detect such a purchase. In such cases, the customer may also choose to manually record receipt information of a purchased item. As illustrated in FIG. 5B, the financial institution mobile app may prompt the customer to take a photograph of the hard copy receipt or alternatively save an electronic copy of the receipt (or an email detailing the purchase) that is transmitted to a computing device of the customer from the merchant or online merchant.

A receipt detail screen with data fields may be pre-filled upon receiving the receipt from the customer. For example, an optical character recognition (OCR) or text recognition of the photograph of the receipt, the scanned receipt, an electronic receipt, or an email detailing the purchase may be performed to pre-fill the receipt information. As shown in FIG. 5C, the data fields may include a purchased item (including the item name and description), a purchase date, a purchase amount, and seller/retailer information. Although it is not shown in FIG. 5C, the data fields may further include a retention period, warranty information, and a category of which the receipt is stored in the secure database. As described above, those data fields may be editable by the customer. For example, the data fields may be edited by the customer via a user interface (e.g., a touch screen and/or a keyboard) and/or a voice recognition. As illustrated in FIG. 5C, the customer may edit the purchased item information by selecting the corresponding data field to specify that the purchased item is "Sony Flat Screen TV for Family Room."

Subsequently, the receipt information as indicated (or edited) in the data fields may be stored in the secure database associated with the financial institution (also referred to as a secure vault in this application). The confirmation may be presented to the customer as shown in FIG. 5D. As discussed above, such a secure database may be a part of the server (e.g., 110) associated with the financial institution. Alternatively, in some embodiments, the server (e.g., 110) may access the secure database via a network such as the network 150. This allows the customer to access the secure database to search, retrieve, view, print, text, or email any of the customer's receipts stored in the secure database, which is described further in FIGS. 6A-6D.

Exemplary Process

Referring now to FIGS. 6A-6D, exemplary screen shots of a financial institution mobile app running on of the customer's mobile device (e.g., the computing device 130) for retrieving process of a receipt are shown.

Figure 6A:
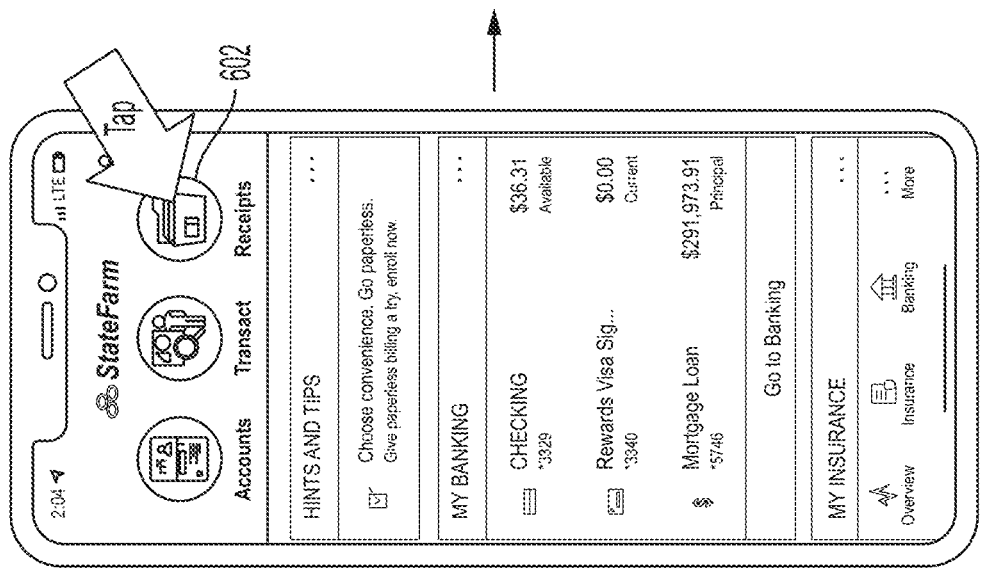
FIG. 6A-6D are exemplary screen shots that may be displayed on the computing device of FIG. 1 for retrieving receipts stored in a secure database of the server of FIG. 1.

To access the secure database, the customer may tap a "Receipts" button 602 shown in FIG. 6A. Under the Receipt Vault menu, the customer has an option to manually capture and/or store a receipt by selecting a "Capture a Receipt" button 612. As discussed above, the receipt may be a hard copy receipt, an electronic receipt, or email detailing a purchase. In some cases, the customer may not be able to produce a receipt. For example, the customer may have lost the receipt of a purchased item or an item was gifted or inherited to the customer. In such cases, the customer may utilize the "Capture a Receipt" button 612 to manually fill the data fields to capture the information of such items. The data fields for the purchased item may include the description of the item, the purchased date, the purchased price, the purchased location, the purchased merchant/store, the condition of the item, the category of the item, the warranty information, the insurance information (e.g., insurer, policy number), and/or the ownership information. The data fields for the gifted or inherited item may include the description of the item, the gifted or inherited date, the value of the gifted or inherited item, the gifted or inherited location, the condition of the gifted or inherited item at the time when the item was gifted or inherited to the insured, the category of the item, the warranty information, the insurance information (e.g., insurer, policy number), and/or the ownership information.

Additionally, under the Receipt Value menu, the customer also has an option to access the secure database (i.e., Receipt Vault in this example) by selecting "Retrieve a Receipt" button 614.

It should be appreciated that, although it is not shown in FIG. 6A-6D, receipts stored in the secure database (e.g., Receipt Vault in this example) may be presented to the customer in a chronological order when the "Retrieve a Receipt" button 614 is selected.

Figure 6D:
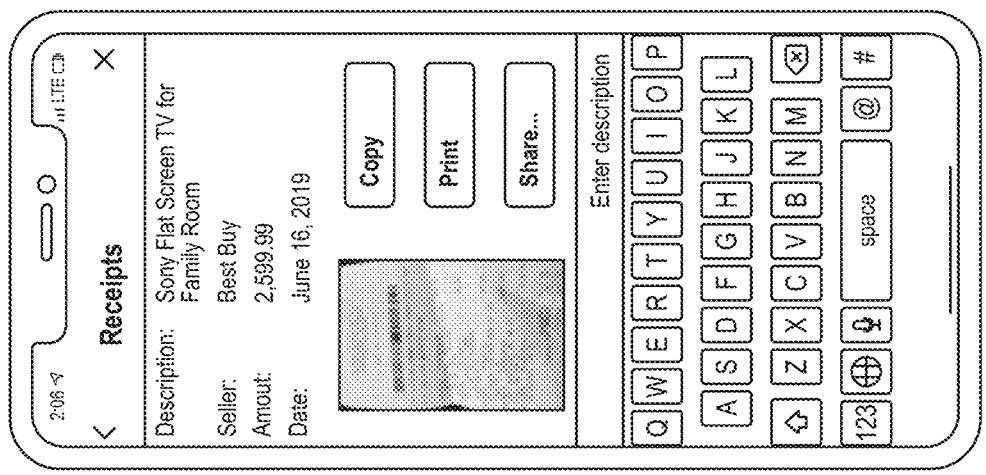
Figure 6C:
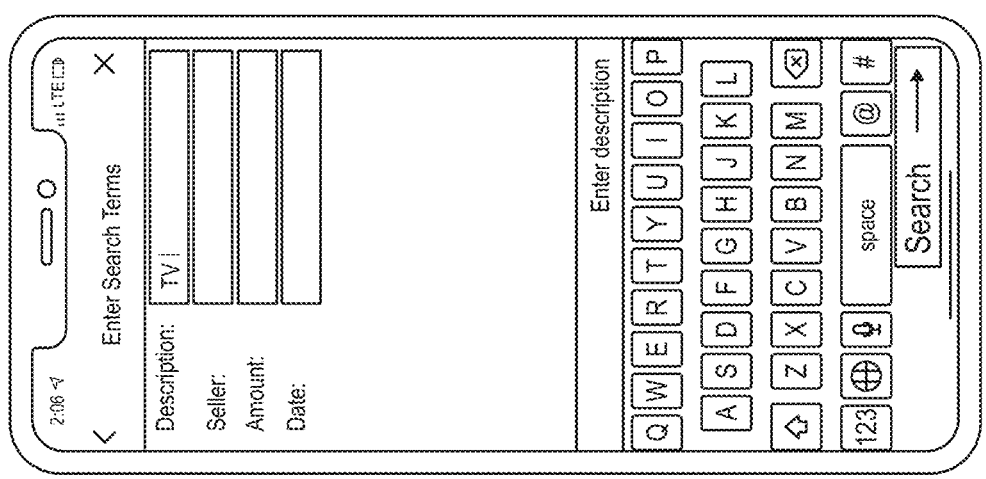
Figure 6B:
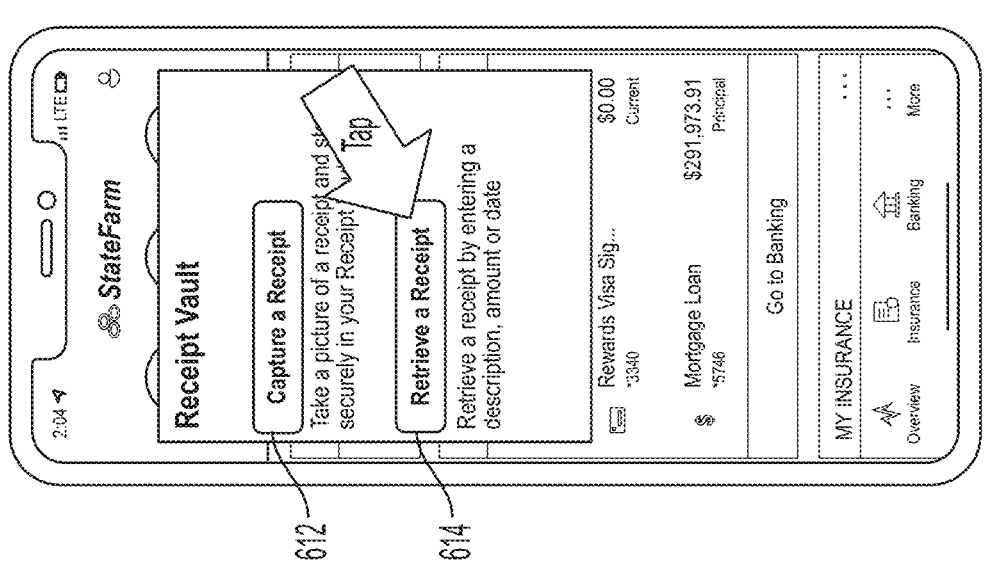

When the "Retrieve a Receipt" button 614 is selected, the customer has an option to search for a particular item y a description, a seller, a purchase amount, and/or a purchase date, as illustrated in FIG. 6C. For example, if the customer search with a term "TV" in the description field, the matching receipt is presented to the customer, as illustrated in FIG. 6D. The customer then has an option to copy the receipt, print the receipt, or share the receipt via a text, an email, or any other suitable means.

Exemplary Embodiments

In one aspect, a computer-implemented method for conducting a receipt capturing process may be provided. The method may be implemented via one or more local or remote processors, servers, sensors, and/or transceivers, The method may include, via the one or more local or remote processors, servers, sensors, and/or transceivers: (1) determining whether a customer purchased an item (e.g., a product or service) using an account that has a receipt capturing tool activated; (2) transmitting, in response to determining that the customer purchased the item using the account that has the receipt capturing tool activated, a captured receipt alert to the customer inquiring whether to capture a receipt of the purchased item; (3) analyzing, in response to receiving an indication to capture the receipt of the purchased item, the receipt to determine receipt information; and/or (4) storing the receipt information in a secure database. The receipt information may include information detailing a purchased item, a purchase date, a purchase amount, seller information, a retention period, warranty information, and a category of which the receipt is stored in the secure database. The receipt information may be stored in the database or memory unit that may be remotely searchable, such as via a customer mobile device. The method may include additional, less, or alternate functionality, including that discussed elsewhere herein.

For instance, the computer-implemented method may include (i) determining whether to activate a receipt capturing tool of a customer's account; (ii) receiving, in response to determining to activate the receipt capturing tool, a preferred communication method for receiving captured receipt alerts; and/or (iii) activating the receipt capturing tool of the account.

The captured receipt alert may include at least one of a purchased item, a purchase date, a purchase amount, seller information, and an inquiry whether to capture and store the receipt. The receipt information may include at least one of a purchased item, a purchase date, a purchase amount, seller information, a retention period, warranty information, and a category of which the receipt is stored in the secure database.

The computer-implemented method may include, via the one or more local or remote processors, servers, sensors, and/or transceivers: linking the receipt information in the stored database to a warranty covering the item or to an electronic version of the warranty covering the item to facilitate remote retrieval of the receipt information and the electronic version of the warranty at a later data, such as remote retrieval via a customer mobile device. The receipt information may be remotely searchable via a customer mobile device, such as searchable by category or data field, as discussed above.

For instance, the receipt information may include at least one of a purchased item, a purchase date, a purchase amount, seller information, a retention period, warranty information, and a category of which the receipt is stored in the secure database, and the receipt information may be remotely searchable, such as via a customer mobile or other computing device, by type of purchased item, purchase date, purchase data range, purchase amount, purchase amount range, seller information, store, store chain, merchant chain, merchant, customer notes, and/or payment type (cash, credit, debit account, check, etc.).

In some embodiments, the receipt may be captured by the receipt capture tool by the customer taking a photo of a hard copy or physical receipt via their mobile device. Additionally or alternatively, the receipt may be captured by the receipt capture tool by saving an electronic receipt sent or transmitted from a merchant or online merchant server or computing device to the customer mobile device or other computing device. Additionally or alternatively, the receipt may be captured by the receipt capture tool by saving an email detailing the purchasing sent or transmitted from a merchant or online merchant server or computing device to the customer mobile device or other computing device.

In another aspect, a computer system for capturing a receipt associated with a purchase of an item may be provided. The computer system may include: (a) a network; (b) a computing device; and (c) a server communicatively coupled to the computing device via the network. The server may be configured to: (1) determine whether a customer purchased an item (e.g., a product or service) using an account that has a receipt capturing tool activated; (2) transmit, in response to a determination that the customer purchased the item using the account that has the receipt capturing tool activated, a captured receipt alert to the customer inquiring whether to capture a receipt of the purchased item; (3) analyze, in response to a receipt of an indication to capture the receipt of the purchased item, the receipt to determine receipt information; and/or (4) store the receipt information in a secure database. The receipt information may include information detailing a purchased item, a purchase date, a purchase amount, seller information, a retention period, warranty information, and a category of which the receipt is stored in the secure database. The receipt information may be stored in a database or memory unit in communication with the server and that may be remotely searchable, such as via a customer mobile device. The system may include additional, less, or alternate functionality, including that discussed elsewhere herein.

For instance, the computer system and/or server may be further configured to: determine whether to activate a receipt capturing tool of a customer's account; receive, in response to a determination to activate the receipt capturing tool, a preferred communication method for receiving captured receipt alerts; and/or activate the receipt capturing tool of the account.

The captured receipt alert may include at least one of a purchased item, a purchase date, a purchase amount, seller information, and an inquiry whether to capture and store the receipt. The receipt information may include at least one of a purchased item, a purchase date, a purchase amount, seller information, a retention period, warranty information, and a category of which the receipt is stored in the secure database.

In another aspect, a computer-implemented method for conducting a receipt capturing process may be implemented via one or more local or remote processors, servers, sensors, and/or transceivers. The method may include, via the one or more local or remote processors, servers, sensors, and/or transceivers: (i) determining whether a customer purchased a service using a customer's account that has a receipt capturing tool activated; (ii) transmitting, in response to determining that the customer purchased the service using the account that has the receipt capturing tool activated, a captured receipt alert to the customer inquiring whether to capture a receipt of the purchased service; (iii) automatically capturing, in response to receiving an indication to capture the receipt of the purchased service, the receipt; (iv) analyzing the receipt to determine receipt information; and/or (v) storing the receipt information in a secure database. The method may include additional, less, or alternate actions, including those discussed elsewhere herein.

For instance, the receipt information may include at least one of a purchased service, a purchase date, a purchase amount, seller information, a retention period, warranty information, and a category of which the receipt is stored in the secure database. The method may also include linking the receipt information in the stored database to a warranty covering the purchased service or to an electronic version of the warranty covering the purchased service to facilitate remote retrieval of the receipt information and the electronic version of the warranty at a later data, such as remote retrieval via a customer mobile device. The method may also include providing an option to purchase a warranty for the purchased service based upon the receipt information.

In another aspect, a computer system for capturing a receipt associated with a purchase of a service may be provided. The system may include a network; a computing device; and a server communicatively coupled to the computing device via the network, the server may be configured to: (i) determine whether a customer purchased a service using a customer's account that has a receipt capturing tool activated; (ii) transmit, in response to a determination that the customer purchased the service using the account that has the receipt capturing tool activated, a captured receipt alert to the customer inquiring whether to capture a receipt of the purchased service; (iii) automatically capture, in response to a receipt of an indication to capture the receipt of the purchased service, the receipt; (iv) analyze the receipt to determine receipt information; and/or (v) store the receipt information in a secure database. The computer system may include additional, less, or alternate functionality, including that discussed elsewhere herein.

Exemplary Features

The present embodiments may reduce worry and increase confidence among customers by providing a simple way to capture, retain, and access receipts (and potentially other important documents) at or near the point of purchase.

Here is how it may work: A customer purchases an item. If purchased using a debit account or credit card, the customer may immediately receive a prompt on their smart phone (text or email, based on personal preference) asking "Would you like to capture and store the receipt for your Seller Name purchase? If the customer answers, "Yes", the mobile app launches and the customer is prompted to snap a photo and validate a few important data elements (most of which will be pre-filled):

Item Purchased: (Customer inputs item name/description here)

Purchase Date: Pre-filled from transaction record (editable)

Purchase Amount: Pre-filled from transaction record (but editable)

Seller: Pre-filled from transaction record (editable)

Retention period: 1 yr (default), + and –buttons will allow customer to select up to 7 years Vault: Purchases (Default), Other Categories can be added After a receipt (or other document) is captured, the customer will have access to retrieve, view, print, text or email the receipt at any time. As long as the document is still in the Secure Vault (retention period not expired), the document would be retrievable via a chronological listing with search capability (search on date, description, seller, amount, etc.).

This will be convenient be for that customer whose 60" television stops working. They can retrieve the receipt instantly and see that the warranty is still in effect, and provide the necessary proof of purchase to the seller.

Customers would also be able to capture receipts later by tapping an icon adjacent to the purchase on their transaction ledger. For purchases made by check or cash, the mobile app would allow a customer to capture and store a receipt as a function of the app built into the menu.

Other capabilities of the present embodiments include OCR/Text recognition; voice memo; photo of items; and real-time and after-the-fact capture. For OCR/Text Recognition functionality the system may interpret text on the receipt to prepopulate data fields. For example, a 'rubber band' capability would allow the user to select a portion of text on the receipt. If possible the image would be converted to text to populate the field.

For Voice Memo functionality, an option may be added to allow voice capture of a data field. For example, a voice memo icon would be provided adjacent to the input field. Selecting the icon would prompt the user to speak a brief description of the item and activate the microphone. The recording may be stored and voice recognition may attempt to convert the recorded words to text.

For Photo of Item functionality, in lieu of a text description, a photo of the item could be stored. For example, a photo icon would be provided adjacent to the input field. Selecting the icon would prompt the user to take a photo of the item with the logo and or model number/serial number visible. The photo may be stored and OCR may attempt to convert model and serial number to text.

For Real-time and After-the-fact Capture functionality, the receipt may be captured at point of sale or anytime thereafter.

Other uses of the present embodiments may include capture warranty information functionality, budgeting/record keeping functionality, and catalog valuable items for insurance/home inventory functionality. The capture warranty information functionality may include or be associated with capturing an image of a warranty card or document; inputting the warranty term, such as in days, months, or years; displaying an estimated warranty expiration data (calculated from days, months or years from the provided purchase date); and/or inputting limitations (original purchaser only, transferable, etc.).

The Budgeting/Record Keeping functionality may include capturing all physical and/or electronic receipts; offering receipt categorization (default and user-created); and/or Summary Reporting based upon data fields (Date, Amount, Category, etc.).

The Catalog Valuable Items for Insurance/Home Inventory functionality may include and/or be related to capturing photos and descriptions of high-value items covered under insurance policy; inputting owner (default to logged-in user); inputting purchase date and price; inputting condition of item; offering item categorization (default and user-created); and/or Summary Reporting based upon data fields (Date, Amount, Category, etc.).

Also, Catalog When an Item is Replaced or Repaired or Improvements were made and there is a warranty period functionality may be provided with the present embodiments. As repair or replacement examples, HVAC and other equipment may be installed having warranties; a new roof may be installed with a 15-, 20- or 25-year warranty; and/or automobile tires with a mileage warranty may be purchased.

Additional Considerations

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

It should also be understood that, unless a term is expressly defined in this patent using the sentence "As used herein, the term" is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware is temporarily configured (e.g., programmed), the hardware need not be configured or instantiated at any one instance in time. Software may accordingly configure a processor, for example, to constitute a particular hardware module at one instance of time and to constitute a different hardware module at a different instance of time. Hardware elements can provide information to, and receive information from, other hardware elements. Accordingly, the described hardware may be regarded as being communicatively coupled.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Similarly, the methods or routines described herein may be at least partially processor-implemented. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. In addition, use of the "a" or "an" are employed to describe elements and components of the embodiments herein. This is done merely for convenience and to give a general sense of the description. In this description, and the claims that follow, the singular also includes the plural unless it is obvious that it is meant otherwise. This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

What is claimed is:

1. A computer-implemented method for conducting a receipt capturing process, the method being implemented via one or more local or remote processors, servers, sensors, and/or transceivers, the method comprising, via the one or more local or remote processors, servers, sensors, and/or transceivers:

transmitting, in response to determining that a customer purchased an item using an account that has a receipt capturing tool activated, a captured receipt alert to the customer inquiring whether to capture a receipt of the purchased item;

automatically capturing, in response to receiving a response to the captured receipt alert having an indication to capture the receipt of the purchased item, the receipt; and storing receipt information in a secure database.

2. The computer-implemented method of claim 1, wherein the receipt includes a hard copy receipt, an electronic receipt, or a receipt email.

3. The computer-implemented method of claim 1, further comprising:
   determining whether to activate a receipt capturing tool of the customer's account;
   receiving, in response to determining to activate the receipt capturing tool, a preferred communication method for receiving captured receipt alerts; and
   activating the receipt capturing tool of the customer's account.

4. The computer-implemented method of claim 1, wherein the captured receipt alert includes at least one of a purchased item, a purchase date, a purchase amount, seller information, and an inquiry whether to capture and store the receipt.

5. The computer-implemented method of claim 1, wherein the receipt information includes at least one of a purchased item, a purchase date, a purchase amount, seller information, a retention period, warranty information, and a category of which the receipt is stored in the secure database.

6. The computer-implemented method of claim 1, further comprising linking the receipt information in the stored database to a warranty covering the purchased item or to an electronic version of the warranty covering the purchased item to facilitate remote retrieval of the receipt information and the electronic version of the warranty at a later data, such as remote retrieval via a customer mobile device.

7. The computer-implemented method of claim 1, further comprising providing an option to purchase a warranty for the purchased item based upon the receipt information.

8. The computer-implemented method of claim 1, wherein the receipt information is remotely searchable via a customer mobile device or other computing device by at least one of type of purchased item, purchase date, purchase data range, purchase amount, purchase amount range, seller information, store, store chain, merchant chain, merchant, customer notes, and payment type.

9. The computer-implemented method of claim I, wherein the receipt information includes at least one of a purchased item, a purchase date, a purchase amount, seller information, a retention period, warranty information, insurance information, a payment type, and a category of which the receipt is stored in the secure database.

10. The computer-implemented method of claim 1, further comprising manually capturing, in response to receiving an indication not to capture the receipt of the purchased item, the receipt to determine receipt information, wherein manually capturing the receipt comprises:
    receiving a photograph of a hard copy receipt via a customer mobile device;
    obtaining or receiving an electronic receipt or a screen shot of the electronic receipt; or obtaining or receiving an email detailing the purchasing or a screen shot of the email.

11. A computer system for capturing a receipt associated with a purchase of an item, the system comprising:
    a network;
    a computing device; and
    a server communicatively coupled to the computing device via the network, the server configured to:
      transmit, in response to a determination that a customer purchased the item using the account that has a receipt capturing tool activated, a captured receipt alert to the customer inquiring whether to capture a receipt of the purchased item;
      automatically capture the receipt in response to receipt of a response to the captured receipt alert having an indication to capture the receipt of the purchased item; and
      store receipt information in a secure database.

12. The computer system of claim 11, wherein the receipt includes a hard copy receipt, an electronic receipt, or a receipt email.

13. The computer system of claim 11, the server is further configured to:
    determine whether to activate a receipt capturing tool of the customer's account;
    receive, in response to a determination to activate the receipt capturing tool, a preferred communication method for receiving captured receipt alerts; and
    activate the receipt capturing tool of the customer's account.

14. The computer system of claim 11, wherein the captured receipt alert includes at least one of a purchased item, a purchase date, a purchase amount, seller information, and an inquiry whether to capture and store the receipt.

15. The computer system of claim 11, wherein the receipt information includes at least one of a purchased item, a purchase date, a purchase amount, seller information, a retention period, warranty information, and a category of which the receipt is stored in the secure database.

16. The computer system of claim 11, wherein the server is further configured to link the receipt information in the stored database to an electronic version of a warranty covering the purchased item to facilitate remote retrieval of the receipt information and the electronic version of the warranty at a later date.

17. The computer system of claim 11, wherein the server is further configured to provide an option to purchase a warranty for the purchased item based upon the receipt information.

18. The computer system of claim 11, wherein the receipt information is remotely searchable via a customer mobile device or other computing device by at least one of type of purchased item, purchase date, purchase data range, purchase amount, purchase amount range, seller information, store, store chain, merchant chain, merchant, customer notes, and payment type.

19. The computer system of claim 11, wherein the receipt information includes at least one of a purchased item, a purchase date, a purchase amount, seller information, a retention period, warranty information, insurance information, a payment type, and a category of which the receipt is stored in the secure database.

20. The computer system of claim 11, wherein the server is further configured to manually capture, in response to a receipt of an indication not to capture the receipt of the purchased item, the receipt to determine receipt information, wherein to manually capture the receipt comprises to:
    receive a photograph of a hard copy receipt via a customer mobile device;
    obtain or receive an electronic receipt or a screen shot of the electronic receipt; or
    obtain or receive an email detailing the purchase or a screen shot of the email.

* * * * *